Oct. 11, 1932.　　H. W. JELLIFFE ET AL　　1,881,625
SPRAY GUN
Filed Feb. 24, 1930　　3 Sheets-Sheet 1
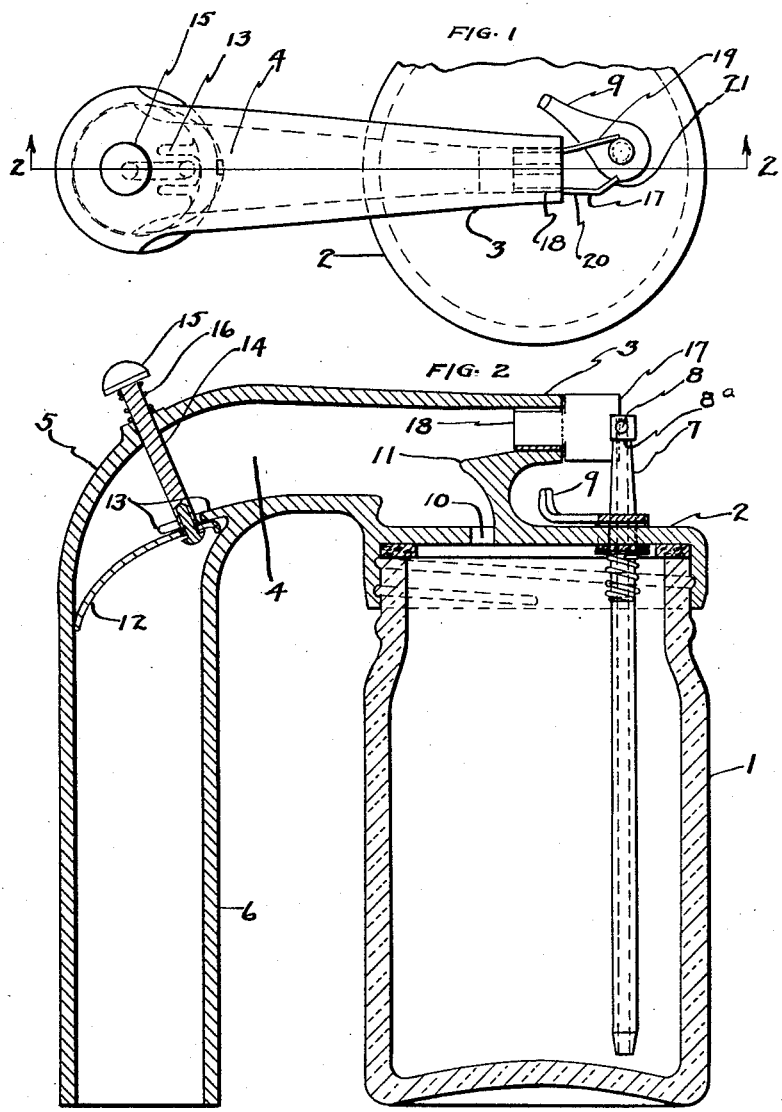
INVENTORS
WALTER H. ABBOTT
HOWARD W. JELLIFFE
BY
Evans & McCoy
ATTORNEY.

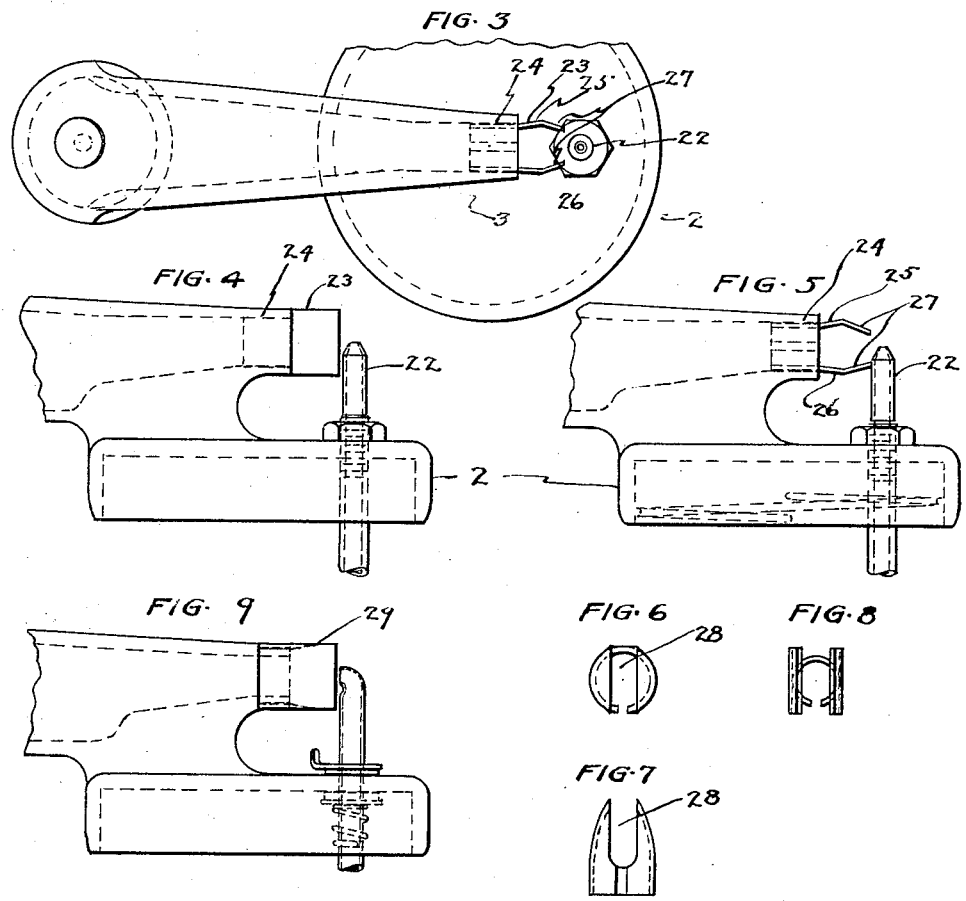

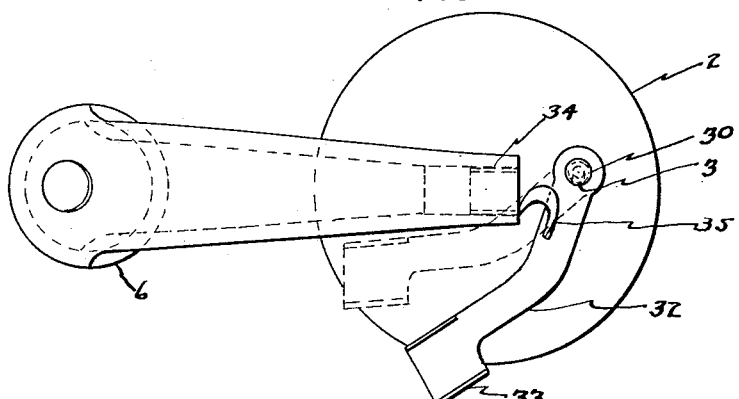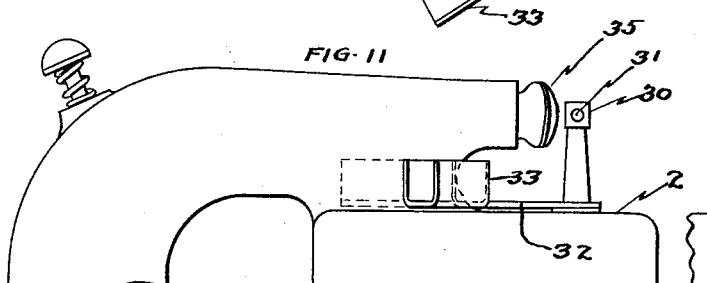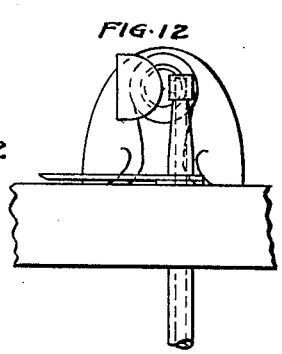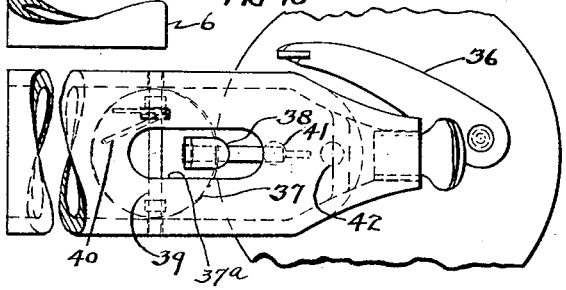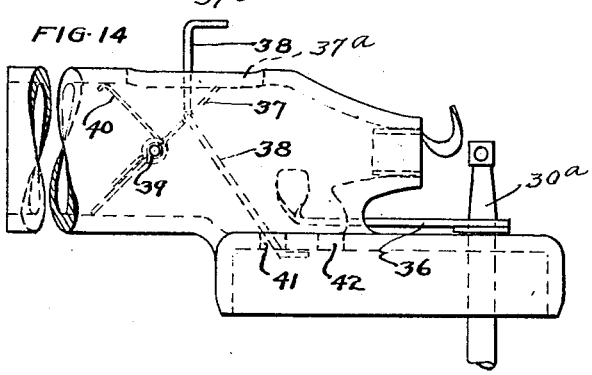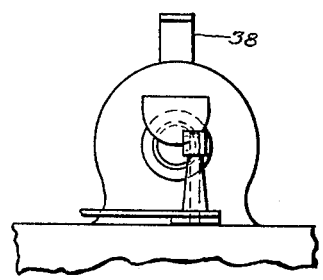

Patented Oct. 11, 1932

1,881,625

UNITED STATES PATENT OFFICE

HOWARD W. JELLIFFE AND WALTER H. ABBOTT, OF CLEVELAND, OHIO, ASSIGNORS TO UTILITY PRODUCTS COMPANY, OF CLEVELAND, OHIO, A CORPORATION OF OHIO

SPRAY GUN

Application filed February 24, 1930. Serial No. 430,772.

The present invention relates to spray guns suitable for spraying liquids and powders such as paints, enamels, lacquers, and insecticides, the present application being a continuation in part of our co-pending application Serial No. 293,013, filed July 16, 1928.

In spraying paint, it is often advantageous to deliver the paint to the surface being painted in a spray which is of laterally elongated form rather than of the circular form in which the spray naturally assumes on issuing from a spray nozzle.

It is an important object of the present invention to provide simple and efficient means for creating a spray of laterally elongated or flattened form.

A further object is to provide an attachment which can be quickly and easily attached to or removed from the spray nozzle and which, when placed on the nozzle, will cause the spray to be laterally elongated or flattened.

A further object is to provide an adjustable spray flattening device by which the spray may be elongated in any desired lateral direction.

A further object is to provide simple and effective means for controlling the spray during the operation of the gun.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 is a plan view of the gun.

Fig. 2 is a central vertical section taken on the line indicated at 2—2 in Fig. 1.

Fig. 3 is a plan view showing a slightly modified form of gun.

Fig. 4 is a fragmentary side elevation of the nozzle portion of the gun shown in Fig. 3.

Fig. 5 is a side elevation similar to Fig. 4 showing the spray flattening deflector adjusted to provide a horizontally elongated or flattened spray.

Fig. 6 is an end elevation of one of the spray flattening attachments.

Fig. 7 is a side elevation of the attachment.

Fig. 8 is an end elevation of a slightly modified attachment.

Fig. 9 is a side elevation showing a spray deflector formed to fit externally on the nozzle.

Fig. 10 is a top plan view of a modified form of spray gun, with another modified form of spray flattening attachment.

Fig. 11 is a side elevation of the gun shown in Fig. 10.

Fig. 12 is a front elevation of the gun shown in Figs. 10 and 11.

Fig. 13 is a top plan view of another modified form of gun.

Fig. 14 is a side elevation of the gun shown in Fig. 13.

Fig. 15 is a front elevation of the gun shown in Figs. 13 and 14.

Referring to the accompanying drawings, the spray gun of the present invention is adapted to be attached to a suitable container for the material to be sprayed, such as the glass jar 1 shown in Fig. 2, and is formed with an integral cover portion 2 which is adapted to be detachably secured upon and close the top of the jar 1 or other container.

An air blast nozzle 3 is integrally connected with the cover member 2 and extends partially across the top thereof. This nozzle is supplied with air through conduit 4 integral with the nozzle which has a right angle bend 5 a short distance to one side of the cover so as to provide an upright handle portion 6 alongside the jar 1, which is of a length such that its lower end will lie in the plane of the bottom of the jar 1 when the jar is attached to the cover member 2. The handle portion 6 is adapted to be detachably coupled to a suitable flexible air hose (not shown) which may be connected to any suitable source of air under pressure such as the pressure outlet of the blower of a vacuum cleaner. When the handle 6 is detached from the air hose, its lower end will rest upon a flat surface supporting the jar to provide a stable support for the jar with the spray gun attachment thereon.

For delivering the material from the container into the air stream issuing from the nozzle 3, an upright tube 7 extends through the cover 2 into the container to a point adjacent the lower end thereof. The lower end of the tube is open and the upper end of the tube has an outlet 8 which may be positioned substantially in axial alinement with the nozzle 3. The tube 7 may be rotatably mounted in the cover and positioned slightly to one side of the axis of the nozzle and, when the tube is so mounted, the outlet 8 will be a lateral outlet which may be adjusted toward and from the axis of the nozzle by turning the tube.

The tube 7 which is laterally offset with respect to the axis of the nozzle 3 may be adjusted by means of a handle 9 attached thereto and extending along the surface of the cover 2 to one side of the nozzle 3, where it may be engaged by a finger of the hand of the operator in which the handle portion 6 is held. The adjustment of the tube 7 about its axis moves the lateral outlet 8 toward and away from the axis of the nozzle varying the entraining action of the air stream on the column of liquid or other material in the tube 7 and consequently varying the rate of flow of material through the tube 7 to the air stream.

It will be observed that there is a short shoulder or lip $8^a$ at the under side of the opening 8 between the edge of the opening and the body of the tube 7. It has been found that this ledge or lip serves to prevent flow of liquid from the opening down the surface of the tube during the spraying operation. As liquid is being drawn up through the tube 7 and delivered into the air stream through the opening 8 some of the liquid will adhere to the wall of the tube around the edge of the opening and, in the absence of the shoulder or lip $8^a$, a part of the liquid accumulating at the lower edge of the opening would flow down the surface of the tube to the top of the cover. However, the overhanging lip or shoulder prevents such leakage by reason of the fact that the liquid in flowing back over the overhanging shoulder accumulates in drops at the outer edge of the shoulder and these drops are brushed off by the rapidly moving air stream.

Means may also be provided for deflecting a portion of the air stream into the container through the cover 2 to increase the pressure upon the material in the container and assist in forcing the material through the tube 7 to the air stream. As shown in Fig. 2, a passage 10 is provided from the air conduit through the cover 2 and the forward wall of this passage projects into the conduit providing a deflecting shoulder 11 for directing a portion of the air stream through the passage 10 into the container.

It is desirable that means be provided for instantly stopping the flow of air through the nozzle to interrupt the spray whenever desired and this control of the air stream is obtained by means of a flap valve 12 which is mounted in the conduit 4 adjacent the upper end of the handle portion 6. The wall of the conduit at the inner side of the bend 5 is provided with a transversely extending recess 13 which receives the inner edge of the flap valve 12 forming a pivotal support for the valve. The valve 12 is extended downwardly at an inclination from the pivot recess 13 so that the pressure of the air tends to force the valve toward closed position.

An operating plunger 14 is attached to the valve 12 adjacent the inner edge thereof and this plunger extends upwardly through the outer wall of the bend 5 and has a head 15 at its outer end which is so positioned that it may be conveniently engaged with the thumb of the hand gripping the handle portion 6. A spring 16 may be interposed between the conduit wall and the head 15 and this spring also acts to normally press the valve toward closed position.

In the operation of the gun, the operator grasps the handle 6 and when he desires to spray material from the container, he presses downwardly on the plunger 14 with the thumb of the hand gripping the handle, opening the valve 12 to permit air under pressure to be delivered to the nozzle 3, holding the valve down with the thumb until he desires to interrupt the spray, at which time he releases the plunger 14 permitting the valve 12 to close. The operator may also regulate the amount of material delivered from the container into the spray by adjusting the handle 9 with a finger of the hand gripping the handle to obtain the desired amount of paint or other material in the spray.

In spraying paint, it is often advantageous to deliver the paint to the surface being coated in a flattened or laterally elongated spray and in order to elongate or flatten the spray, an air deflector 17 is detachably mounted upon the nozzle 3. This air deflector which is preferably made of a single piece of sheet metal has a portion 18 bent to cylindrical form which is contractable so that it may be inserted into the nozzle opening and be detachably held therein.

The air deflector also has spaced deflector plates 19 and 20 which project forwardly from the opposite sides of the nozzle opening, the deflector plate 19 being substantially flat and having a straight forward edge adapted to engage with the tube 7 and the deflector plate 20 having an inwardly bent outer end portion 21, the forward edge of which is parallel with the forward edge of the plate 19 so as to provide an elongated slot between the forward end of the plate 20 and the tube 7. The upper and lower edges of the deflector plates 19 and 20 are also spaced apart to provide outlet slots through which the air may escape freely in opposite lateral directions. When the deflector is positioned as shown in Fig. 1, the spray will be elongated vertically. The deflector attachment 17 may be adjusted angularly in the nozzle 3 and will elongate the spray in the direction in which the slot at the forward end of the deflector is positioned. In this form, however, the greatest elongation of the spray is obtained when the deflector attachment is positioned with the deflector plates vertical as shown in Fig. 1 of the drawings.

In Figs. 3, 4 and 5 of the drawings, there is shown a material delivery tube 22 which is fixed to the cover 2 and which has a contracted discharge opening at its upper end positioned substantially at the axis of the nozzle 3. With this form of material delivery tube, an air deflector 23 is employed which has a cylindrical portion 24 detachably fitting in the end of the nozzle and deflector plates 25 and 26 projecting forwardly from opposite sides of the nozzle opening. The deflector plates have converging forward end portions 27 which provide an elongated slot for the passage of air between them, the opposite side edges of the deflector plate being also spaced to permit air to escape freely in diametrically opposite directions. The forward end of the spray flattening deflector 23 is preferably positioned closely adjacent the discharge end of the tube 22 and may be adjusted both angularly and longitudinally in the nozzle so that the angular position of the deflector may be changed as desired and so that the deflector may be adjusted toward or from the tube 22.

As shown in Figs. 6 and 7, the air deflector may be formed to provide a slot 28 of uniform width along opposite sides and across the end thereof or the deflector plates may be straight in transverse section, as shown in Fig. 8.

The cylindrical portion of the spray flattening deflector may be formed to engage either the interior or the exterior of the air nozzle 3 and, in Fig. 9 of the drawings, there is shown an air deflector 29 which fits upon the exterior of the nozzle.

In Figs. 10 and 11 of the drawings, there is shown another form of air deflector which may be employed in connection with a rotatably mounted material delivery tube. In this modification, a tube 30 similar to the tube 7 shown in Figs. 1 and 2 is rotatably mounted in the cover 2 and is provided with a lateral outlet 31. The tube 30 is mounted slightly to one side of the axis of the nozzle 3 and is adjusted angularly to regulate the delivery of material to the air stream by means of a handle 32 attached thereto adjacent the top of the cover and extending from the tube to the right hand side of the nozzle 3. The handle 32 is provided at its outer end with a channel portion 33 which is adapted to receive the index finger of the hand of the operator which is grasping the handle portion 6. The lateral outlet 31 is so positioned with respect to the handle 32 that when the end portion 33 of the handle is positioned against the side of the nozzle, the outlet is positioned toward the nozzle and the delivery of material is cut off. By pushing the handle 32 outwardly away from the nozzle, the outlet 31 may be brought to a position facing the axis of the air stream in which position a maximum suction is created by the air stream in the tube. The operator, by moving the handle 32 with his finger, can regulate the amount of paint or other material delivered to the spray during the operation of the gun and may instantly cut off the discharge of material by shifting the handle 32 against the nozzle.

In Figs. 10 and 11, there is also shown a modified form of air deflector which has a cylindrical portion 34 adapted to fit in the nozzle and a single curved deflector plate 35 which is positioned on the side of the nozzle opposite that to which the tube 30 is offset. The deflector plate 35 is curved inwardly toward the axis of the nozzle and then outwardly and is also curved transversely. When the deflector plate 35 is positioned, as shown in Fig. 10 of the drawings, a horizontally elongated spray is produced. The deflector may be adjusted angularly to produce a vertically elongated spray, as shown in Fig. 13.

In Figs. 13 and 14 of the drawings, the tube 30a is shown provided with a handle 36 which extends rearwardly from the tube along the left hand side of the nozzle and this handle can be operated in a manner similar to the handle 32 shown in Figs. 10 and 11.

In this modification of the invention, the discharge of air through the nozzle is controlled by means of a butterfly valve 37 which is adapted to be operated by a push rod 38 extending upwardly through an elongated slot 37a in the top of the blast tube, the rod being pivotally attached to the valve 37 above the pivotal axis 39 thereof. The valve 37 is movable from a horizontal open position to a forwardly inclined closed position in which the air stream is deflected by the valve through the slot 37a, the valve being normally held in closed position by a suitable spring 40 attached to the pivot 39 of the valve and engaging the wall of the tube. The push rod 38 extends down through a guide slot 41 in the cover of the receptacle which serves to maintain the projecting portion of the rod in upright position. The slot 37a projects beyond the upper end of the valve 38 when the valve is closed and the receptacle cover is provided with an opening 42 into the blast tube forwardly of the valve through which air may enter the receptacle from the tube during the spraying operation and through which the interior of the receptacle is vented upon closing of the valve 38, the air escaping from the receptacle through the opening 42 passing freely out through the forward end of the slot 37a.

It will be apparent that the present invention provides a spray gun of very compact and convenient form in which both the pressure of the air and the proportion of paint or other material delivered in the spray can be accurately regulated during the spray operation, and that the controlling devices herein disclosed are very practical and convenient for the reason that the controlling devices can be operated by the hand of the operator in which the gun is supported. Furthermore, the present invention provides very simple and effective means for producing a flattened or laterally elongated spray when desired.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. A spray gun comprising a cover member adapted to be secured on the top of a container for the material to be sprayed, an air nozzle attached to said cover member, a tube for delivering material from the container to the air stream issuing from the nozzle extending through the cover and having an outlet in advance of the discharge opening of the nozzle, and a spray flattening air deflector secured to the nozzle and projecting from the end of the nozzle toward said tube, said deflector being angularly adjustable on said nozzle.

2. A spray gun comprising a cover member adapted to be secured on the top of a container for the material to be sprayed, an air nozzle attached to said cover member, a tube for delivering material from the container to the air stream issuing from the nozzle and extending through the cover and having an outlet in advance of the discharge opening of the nozzle, and a spray flattening air deflector secured to the nozzle and projecting from the end of the nozzle toward said tube, said deflector being adjustable on said nozzle toward and away from said tube.

3. A spray gun comprising a cover member adapted to be secured on the top of a container for the material to be sprayed, an air nozzle attached to said cover member, a tube for delivering material from the container to the air stream issuing from the nozzle extending through the cover, said tube being positioned in advance of the discharge end of the nozzle, and a spray flattening air deflector secured to the nozzle and projecting from the end of the nozzle toward said tube, said deflector comprising spaced deflector plates projecting from opposite sides of the nozzle opening.

4. A spray gun comprising a cover member adapted to be secured on the top of a container for the material to be sprayed, an air nozzle attached to said cover member, a tube for delivering material from the container to the air stream issuing from the nozzle extending through the cover, said tube being positioned in advance of the discharge end of the nozzle, and a spray flattening air deflector secured to the nozzle and projecting from the end of the nozzle toward said tube, said deflector comprising spaced deflector plates projecting from opposite sides of the nozzle opening, and converging toward the forward ends thereof.

5. A spray gun comprising a cover member adapted to be secured on the top of a container for the material to be sprayed, an air nozzle attached to said cover member, a tube for delivering material from the container to the air stream issuing from the nozzle extending through the cover and having an outlet in advance of the discharge opening of the nozzle, and a spray flattening air deflector secured to the nozzle and projecting from the end of the nozzle toward said tube, said deflector being adjustable angularly about the axis of the nozzle and longitudinally of said axis toward and away from said tube.

6. A spray gun comprising a cover member adapted to be secured on the top of a container for the material to be sprayed, an air nozzle attached to said cover member, a tube for delivering material from the container to the air stream issuing from the nozzle extending through the cover and having an outlet in advance of the discharge opening of the nozzle, and a spray flattening air deflector secured to the nozzle and projecting from the end of the nozzle toward said tube, said deflector comprising spaced deflector plates projecting from opposite sides of the nozzle opening, said deflector being adjustable angularly about the axis of the nozzle and longitudinally of said axis toward and away from said tube.

7. A spray gun comprising a cover member adapted to be secured on the top of a container for the material to be sprayed, an air nozzle attached to said cover member, a tube for delivering material from the container to the air stream issuing from the nozzle extending through the cover and having an outlet in advance of the discharge opening of the nozzle, and a spray flattening air deflector secured to the nozzle and projecting from the end of the nozzle toward said tube, said deflector being formed of resilient sheet metal and having an end portion in the form of a split contractible band adapted to engage the nozzle to hold the deflector in place thereon.

8. A spray gun comprising a cover member adapted to be secured on the top of a container for the material to be sprayed, an air nozzle attached to said cover member, a tube for delivering material from the container to the air stream issuing from the nozzle extending through the cover, said tube being positioned in advance of the discharge end of the nozzle, and a spray flattening air deflector secured to the nozzle and projecting from the end of the nozzle toward said tube, said deflector comprising spaced deflector plates projecting from opposite sides of the nozzle opening, the edges of the two deflector plates being substantially parallel along opposite sides of the deflector and across the end thereof.

9. A spray gun comprising a cover member adapted to be secured on the top of a container for the material to be sprayed, an air nozzle attached to said cover member, a tube for delivering material from the container to the air stream issuing from the nozzle extending through the cover and having an outlet in advance of the discharge opening of the nozzle, and a spray flattening air deflector secured to the nozzle and projecting from the end of the nozzle toward said tube, said deflector comprising spaced deflector plates projecting from opposite sides of the nozzle opening, one of said deflector plates projecting beyond the other for engagement with said tube.

10. A spray gun comprising a cover member adapted to be secured on the top of a container for the material to be sprayed, an air nozzle attached to said cover member, a tube for delivering material from the container to the air stream issuing from the nozzle extending through the cover and rotatably mounted in the cover, said tube having a lateral outlet adapted to be positioned to open laterally into the air stream issuing from the nozzle, and spray flattening means comprising a deflector plate projecting forwardly from one side of the nozzle and having its forward end alongside and spaced from said tube.

11. A spray gun comprising a cover member adapted to be secured on the top of a container for the material to be sprayed, an air nozzle attached to said cover member, a tube for delivering material from the container to the air stream issuing from the nozzle extending through the cover and rotatably mounted in the cover, said tube having a lateral outlet adapted to be positioned to open laterally into the air stream issuing from the nozzle, and spray flattening means comprising a deflector plate projecting forwardly from one side of the nozzle and having its forward end alongside and spaced from said tube, and a second deflector plate extending from the opposite side of the nozzle to said tube.

12. A spray gun comprising a cover member adapted to be secured on the top of a container for the material to be sprayed, an air nozzle attached to said cover member, a tube for delivering material from the container to the air stream issuing from the nozzle extending through the cover and rotatably mounted in the cover, said tube having a lateral outlet adapted to be positioned to open laterally into the air stream issuing from the nozzle, and spray flattening means comprising a deflector plate projecting forwardly from one side of the nozzle and having its forward end alongside and spaced from said tube, said deflector plate being inclined inwardly toward the axis of the nozzle.

13. A spray gun comprising a cover adapted to be secured on the top of a container for the material to be sprayed, a horizontally disposed air nozzle attached to the top of said cover, means for delivering material from the container into the air stream issuing from the nozzle, a conduit extending from the nozzle through which air under pressure is delivered to the nozzle, said conduit having a right angle bend at one side of the cover to provide an upright handle portion adapted to be gripped in the hand of an operator, a downwardly opening valve in the conduit adjacent the upper end of the handle portion, a valve operating plunger extending through the top of the bend of the conduit in position to be operated by the thumb of the hand gripping said handle portion, and means including a movable member extending alongside the nozzle in a position to be operated by a finger of the hand gripping the handle portion, for controlling the delivery of material from the container to the air stream issuing from the nozzle.

14. An atomizer comprising a receptacle for material to be sprayed, a cover for said receptacle, a spray nozzle carried by the cover, a conduit extending from the nozzle through which an air stream is delivered to the nozzle, means for supplying air under pressure to the receptacle, a tube for delivering material from the receptacle to the air stream issuing from the nozzle, said tube being rotatably mounted in the cover for angular adjustment during operation and having a lateral opening above the cover which in different angular adjustments of the tube is differently disposed with respect to the air stream.

15. An atomizer comprising a receptacle for material to be sprayed, a cover for said receptacle, a spray nozzle carried by the cover, a conduit extending from the nozzle through which an air stream is delivered to the nozzle, a tube for delivering material from the receptacle to the air stream issuing from the nozzle, said tube extending through the cover and having one end opening into receptacle and the other positioned in their air stream issuing from the nozzle, said tube being adjustable angularly about its axis during operation and having a lateral opening in the end thereof positioned in the air stream.

16. An atomizer comprising a receptacle for material to be sprayed, a spray nozzle, a conduit extending from the nozzle through which an air stream is delivered to the nozzle, means for supplying air under pressure to the receptacle, a tube for delivering material from the receptacle to the air stream issuing from the nozzle, said tube being rotatably mounted for angular adjustment during operation and having a lateral opening in the portion of the tube in the air stream which in different angular adjustments of the tube is differently disposed with respect to the air stream.

17. An atomizer comprising a receptacle for material to be sprayed, a spray nozzle, a conduit extending from the nozzle through which an air stream is delivered to the nozzle, a tube for delivering material from the receptacle to the air stream issuing from the nozzle, said tube having one end opening into receptacle and the other positioned in the air stream issuing from the nozzle, said tube being positioned eccentrically with respect to the nozzle opening and adjustable angularly about its axis and having a lateral opening in the end thereof positioned in the air stream.

18. An atomizer comprising a receptacle for liquid to be sprayed, a spray nozzle, a conduit extending from the nozzle through which an air stream is delivered to the nozzle, and a tube extending from the receptacle to the nozzle and having a lateral opening for delivering liquid into the air stream, said tube being movable angularly about its axis during operation to adjust said opening with respect to the air stream and being formed to provide an overhanging shoulder at the lower edge of said opening between the edge of said opening and the body of said tube.

19. An atomizer comprising a receptacle for material to be sprayed, a cover for said receptacle, a spray nozzle attached to the cover, a conduit extending from the nozzle through which an air stream is delivered to the nozzle, a tube for delivering the material from the receptacle to the air stream issuing from the nozzle, said tube being rotatably mounted in said cover and having one end opening into the receptacle and the other having a lateral discharge opening and positioned in the air stream issuing from the nozzle and an arm attached to said tube above the cover by means of which said tube may be adjusted angularly about its axis during the operation of the atomizer.

In testimony whereof we affix our signatures.

WALTER H. ABBOTT.
HOWARD W. JELLIFFE.

CERTIFICATE OF CORRECTION.

Patent No. 1,881,625.     October 11, 1932.

HOWARD W. JELLIFFE ET AL.

It is hereby certified that error appears in the printed specification of the above numbered patent requiring correction as follows: Page 4, lines 67 and 81, claims 3 and 4, after the word "nozzle", and page 5, line 13, claim 8, after the syllable "zle" insert the words "and having an outlet for delivering material into the air stream issuing from the nozzle"; page 6, line 5, claim 15, for "their" read "the"; and that the said Letters Patent should be read with these corrections therein that the same may conform to the record of the case in the Patent Office.

Signed and sealed this 20th day of December A. D. 1932.

M. J. Moore,
Acting Commissioner of Patents.

(Seal)